C. E. HUTCHINGS.
PHOTOGRAPHIC CAMERA BACK.
APPLICATION FILED OCT. 21, 1918.
1,291,004.
Patented Jan. 14, 1919.
2 SHEETS—SHEET 1.
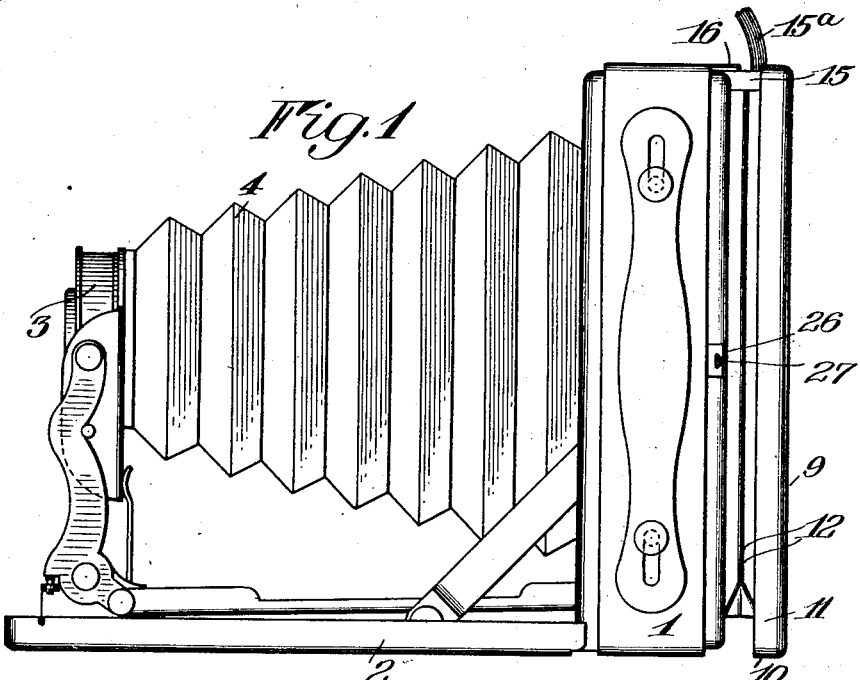
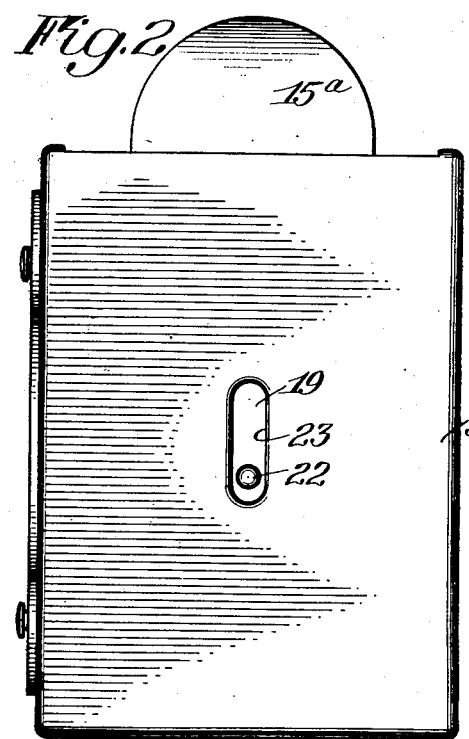
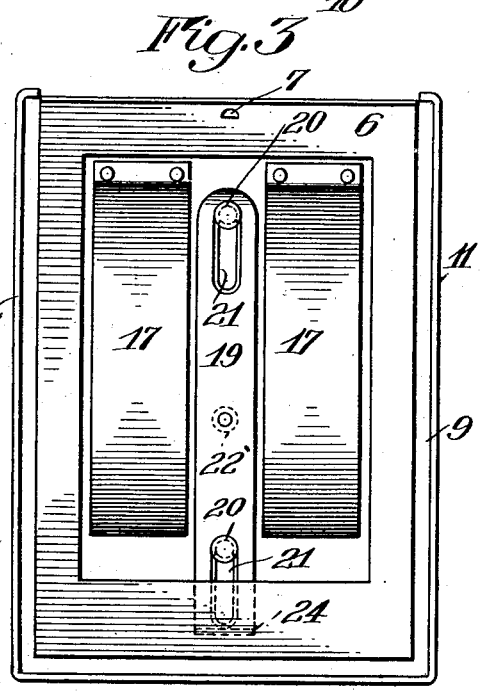
Witnesses:
Nelson H. Copp
N. Gertrude Weeks.
INVENTOR
Charles E. Hutchings
BY
his ATTORNEYS

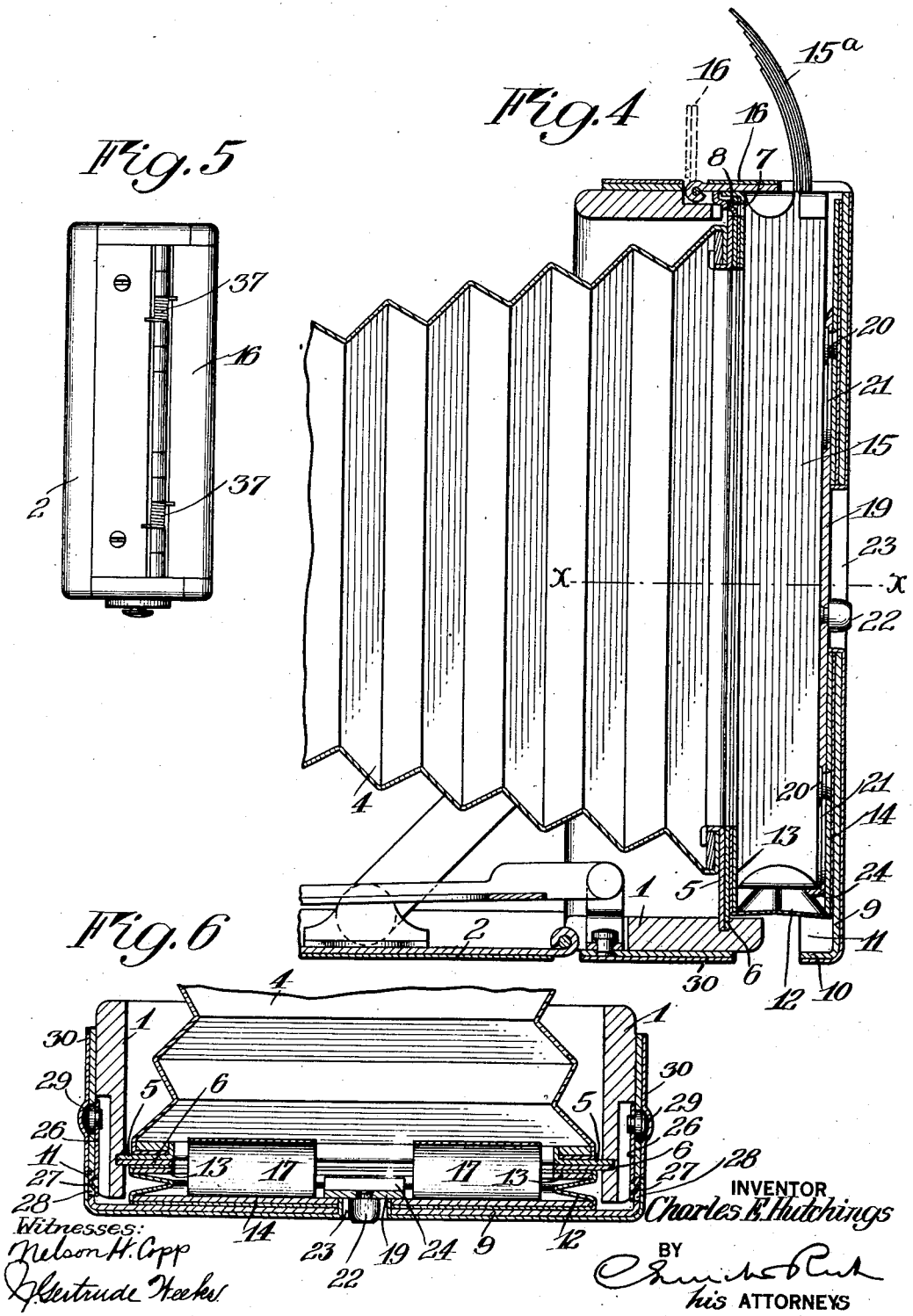

UNITED STATES PATENT OFFICE.

CHARLES E. HUTCHINGS, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-CAMERA BACK.

1,291,004.      Specification of Letters Patent.      Patented Jan. 14, 1919.

Application filed October 21, 1918. Serial No. 259,037.

*To all whom it may concern:*

Be it known that I, CHARLES E. HUTCHINGS, of Rochester, in the county of Monroe and State of New York, have invented certain new and useful Improvements in Photographic-Camera Backs; and I do hereby declare the following to be a full, clear, and exact description of the same, reference being had to the accompanying drawings, forming a part of this specification, and to the reference-numerals marked thereon.

My present invention relates to photographic cameras, and particularly to camera backs adapted for securing in position a holder for sensitized materials, such as a film pack, whereby the holders may be readily applied and removed, as desired, and when no holder or film pack is in position, the parts of the camera are compactly folded. The invention further consists in the construction for carrying out the objects stated, which may be readily removed when desired, to permit the insertion of a roll holder or back of a different construction, all as will hereinafter be more fully described, the novel features being pointed out in the claims at the end of the specification.

In the drawings:

Figure 1 is a side elevation of a camera to which my invention is applied, a film pack being shown in operative position;

Fig. 2 is a rear elevation of the camera back;

Fig. 3 is a front elevation of the same, removed;

Fig. 4 is a vertical central section showing the film pack in elevation;

Fig. 5 is a top plan view with the back collapsed, or closed;

Fig. 6 is a horizontal section on line $x$—$x$ of Fig. 4.

Similar reference numerals in the several views indicate the same parts.

While the invention may be applied to a camera of any desired construction, I have shown it adapted to a well-known type embodying a rear frame 1 provided with a pivoted front or closure 2 supporting at its forward end the lens holder 3, 4 indicating the bellows extending from the lens holder to what may be termed a body member in the form of the rear plate 5 containing the exposure aperture, and is secured in the sides and bottom of the frame 1, as shown in Figs. 4 and 5. The frame 1 is provided at the sides and bottom with grooves for the reception of the edges of a plate 6 constituting the front of the removable camera back formed with an aperture coextensive with that in the bellows plate 5, and adapted to be removed and secured in said ways, which in the present instance are formed in part by the rear of the plate 5. The upper end of front plate 6 of the removable camera back is provided with a notch or recess 7 with which engages a spring catch 8 adapted to retain the back in position when slid vertically in the guideways in the frame 1. The rear portion of the camera back consists of a plate 9, preferably of metal, having a flange 10 at the bottom, and flanges 11 at the sides, adapted to extend over the rear edges of the frame of the camera when the back plate 9 is in closed position, as shown in Fig. 6, and the plates 6 and 9 are connected at the sides and on the bottom by a collapsible member in the form of a bellows 12 secured to the plate 6 by a plate 13, and to the plate 9 by a plate 14 secured thereto, the edges of the bellows being clamped between said plates, as shown in Fig. 6. The upper end of the camera back is open for the insertion of a film pack 15 when said back is moved to the rear, as shown in Fig. 4, but when closed, this opening is covered by a hinged flap or door 16 (Fig. 5) said door being hinged to the camera frame 1 and operated to closed position by springs 37 extending around the pintles of the hinge.

When the camera back is moved rearwardly and the film pack is in position, the operating tabs 15ª of the latter extend vertically in the rear of the edge of the door 16 so that they may be operated to change the films in the usual manner. 17 indicates leaf springs secured at one end to the rear plate 9 and coöperating with the back of the film pack, serving to press it firmly against the plate forming the front side of the camera back, to hold the films in proper focal position. 19 represents a slide plate mounted on the back plate 9 and secured in position by headed pins 20 operating in slots 21, said plate being also provided with an operating handle 22 extending through a slot 23 in the rear plate, whereby the slide may be manipulated from the outside of the camera, the lower end of the plate 19 being provided with a hook or projection 24 adapted when the slide is in lowermost position to extend beneath the lower end of the film pack 15 and serving as a means for ejecting the latter by a vertical movement. The film pack is normally held in proper position by the spring-operated lid or door 16, but when it is desired to remove the pack the upward movement of the slide 19 will cause it to open and the end of the pack to extend above the camera so that the pack may be readily removed. The plate 9 of the camera back is supported entirely upon the bellows 12 but when the back is collapsed against the frame 1 it is adapted to be secured rigidly in position by spring catches 26 mounted on the sides of the frame 1 having engaging portions 27 entering slots or depressions 28 in the flanges 11, said catches having operating portions 29 accessible from the exterior of the camera and covered by the leather covering 30 of the latter.

The operation of the device will be understood from an examination of Figs. 4 and 6 of the drawing. In order to apply either a plate holder or film pack, the operator presses upon the projection 29, releasing the back and moving plate 9 rearwardly, then by raising the lid or door 16, inserts the film pack or holder vertically into the space inclosed on three sides by the bellows and allows the lid or door 16 to be returned to normal position by the spring 37. The springs 17 press the film pack or holder firmly in contact with the rear of the camera and in the proper focal plane. The springs 37 controlling the lid or door 16 are sufficiently strong to prevent vertical movement of the film pack when the film tabs 15ª are pulled outwardly, but if desired, other holding means could be employed. When it is desired to remove the film pack, the slide 19 is operated vertically by the projection 22 and the tension of the spring 37 controlling the flap 16 is overcome. After the removal of the film pack or plate holder, the parts of the back are collapsed and secured by the spring catches 26 as shown in Fig. 6, the side flanges of the back plate extending over and coöperating with sides of the camera frame to form a smooth joint, as shown.

The back shown can be readily applied to cameras having ways formed in the rear sides thereof for the reception of the edges of the plate 6, and if desired can be readily removed for the application of any other attachment, as, for instance, a roll holder.

By the employment of the rear plate supported entirely by a bellows extending around the three sides, the holder for a sensitized material is protected at all times from light, and film packs or plate holders of different thickness may be inserted and removed as desired.

I claim as my invention:

1. The combination with a camera having the exposure opening at the rear, of a rearwardly movable back covering said opening and a collapsible bellows connecting the back and camera to permit the insertion of a holder for sensitized material between them.

2. The combination with a camera having the exposure opening at the rear, of a rearwardly movable back covering said opening having flanges on three sides coöperating with the camera frame and a collapsible bellows connecting the frame and back and supporting the latter but permitting its rearward movement for the insertion of a holder for sensitized material between them.

3. The combination with a camera having the exposure opening in the rear, of a rearwardly movable back covering said opening having flanges on three sides coöperating with the camera frame, a collapsible bellows connecting the frame and back and a spring operated door extending between the camera and back on the fourth side of the latter and covering the space between the parts when the back is moved toward the camera.

4. The combination with a camera having the exposure opening in the rear and the adjacent guideways, of a removable camera back comprising an apertured front coöperating with said guideways, a back plate and a collapsible bellows connecting them on three sides to permit the insertion of a holder for sensitized material between them.

5. The combination with a camera having an exposure opening in the rear, and the adjacent guideways, of a removable camera back comprising an apertured front coöperating with said guideways, a back plate and a collapsible bellows connecting them on three sides, and a yielding door arranged over the open side of the bellows and closing the opening between the front and back plate when the connecting bellows is collapsed.

6. The combination with a camera having a rear exposure opening, of a rearwardly movable back having the springs on its inner side, a collapsible bellows connecting the back and camera on three sides only, a sliding film pack ejector mounted on the back and a spring closed door extending over the fourth side of the space between the back and camera.

7. The combination with a camera having an exposure aperture at the rear, of a movable camera back extending over said opening comprising an apertured front plate, a rear plate having a spring on its inner side and a collapsible bellows connecting said plates on three sides and detachable securing devices between the camera and the rear plate for holding the parts in position with the bellows collapsed.

8. The combination with a camera having the rear exposure opening, of a camera back comprising an apertured front plate, a rear plate having the spring on the inner side and a collapsible bellows connecting the plates on three sides, an ejector on the rear plate movable toward the fourth side thereof and detachable catches between the sides of the rear plate and the camera frame.

9. The combination with a camera having the rear exposure opening and guides at the sides thereof, of a removable camera back comprising the apertured front plate operating in the guides, a rear plate having a spring on its inner side, collapsible connections between the plates, and catches between the camera frame and the rear plate for holding the latter in collapsed position.

10. The combination with a camera having the exposure aperture at the rear, of the movable back comprising the apertured front plate, the rear plate having the flanges at the sides coöperating with the camera frame at the sides and bottom to form a tight joint when closed, collapsible connections between the front and rear plates, catches for holding the rear plate against the camera frame and an outwardly yielding spring operated door extending between the plates when in closed position.

11. The combination with a camera having the rear exposure aperture and the guides at the sides of said aperture, of a removable back comprising the apertured front plate sliding in the guides, the rear plate having a spring on its inner side, a collapsible bellows extending between the plates on three sides, the sliding ejector on the door, detachable catches between the sides of the rear plate and the camera frame and an outwardly opening spring operated door extending between the plates of the back when the latter are collapsed but affording a space for film pack tabs when the parts are extended.

CHARLES E. HUTCHINGS.